ID="N" />

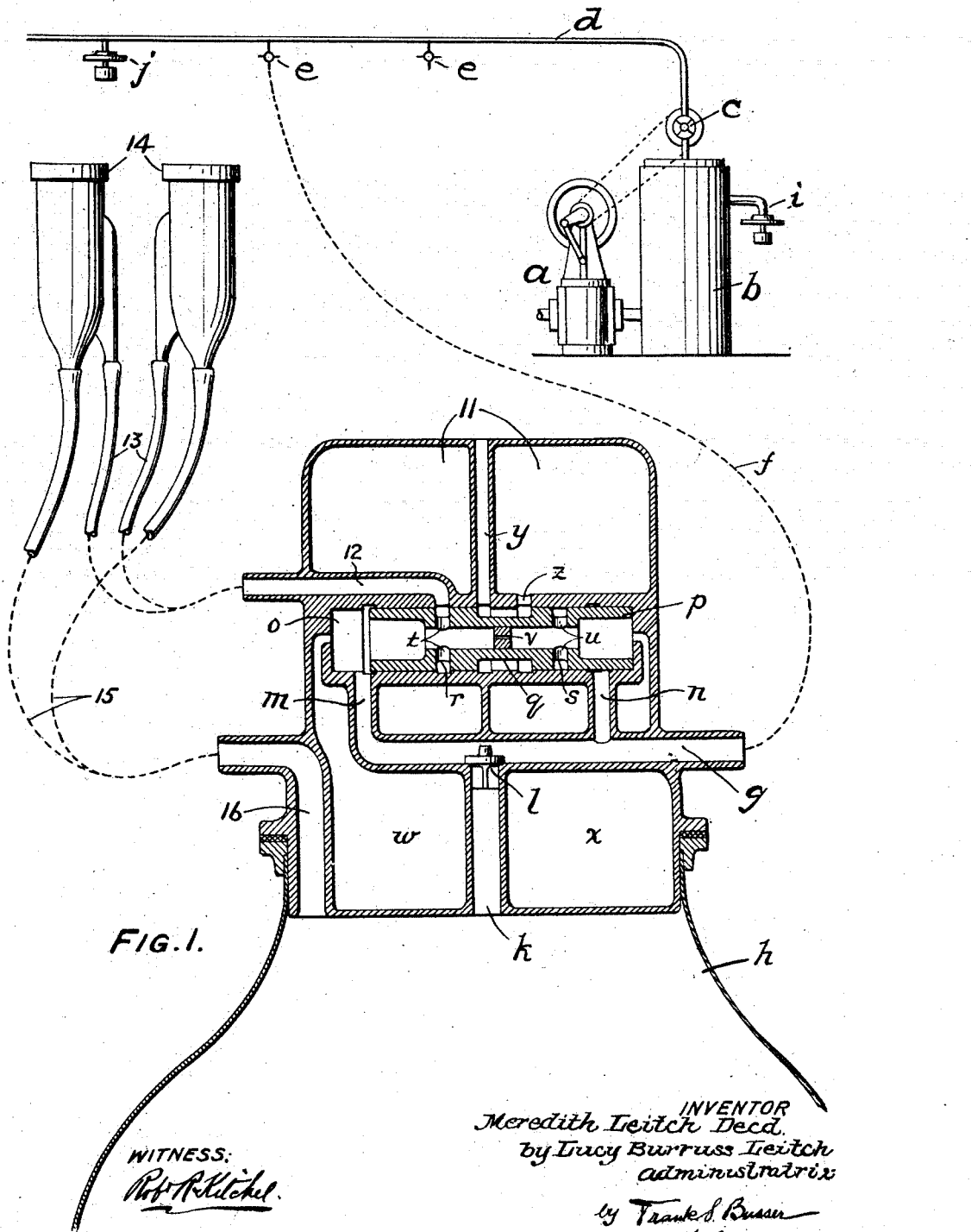

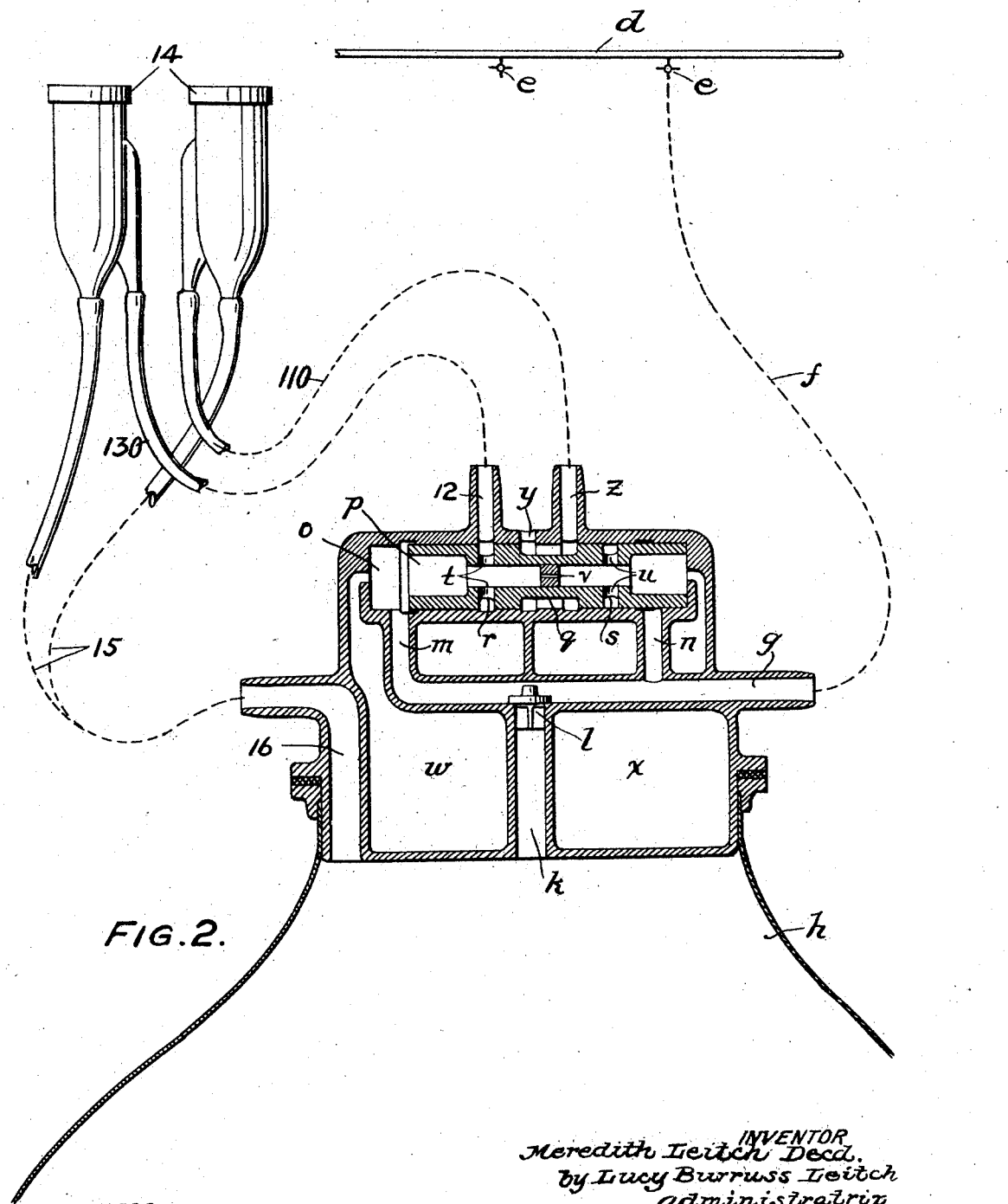

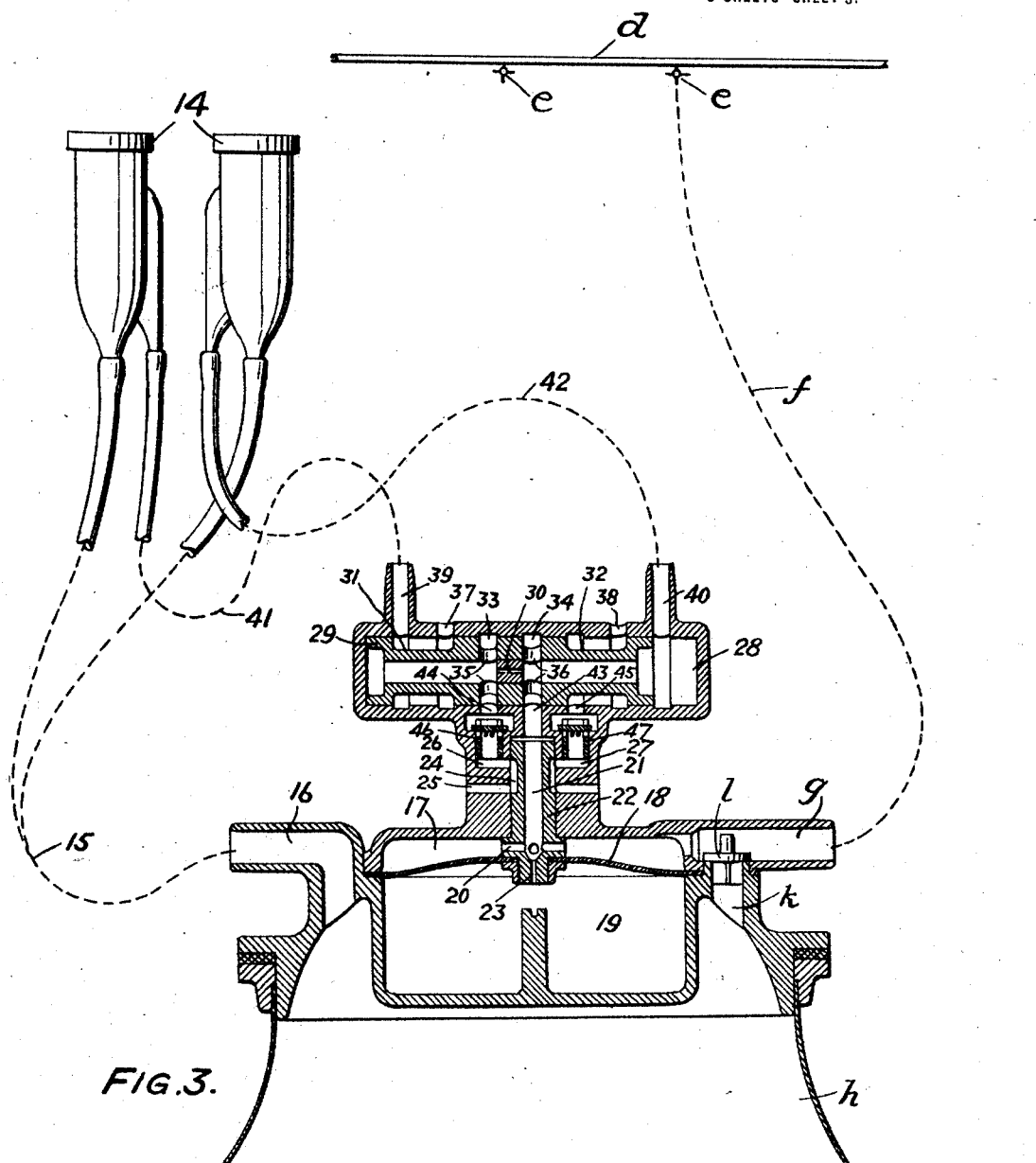

UNITED STATES PATENT OFFICE.

MEREDITH LEITCH, DECEASED, LATE OF POUGHKEEPSIE, NEW YORK, BY LUCY BURRUSS LEITCH, ADMINISTRATRIX, OF MONTGOMERY, ALABAMA, ASSIGNOR TO THE DE LAVAL SEPARATOR COMPANY, OF NEW YORK, N. Y., A CORPORATION OF NEW JERSEY.

MILKING-MACHINE-OPERATING SYSTEM.

1,415,882.  Specification of Letters Patent.  Patented May 16, 1922.

Application filed December 6, 1920. Serial No. 428,450.

*To all whom it may concern:*

Be it known that MEREDITH LEITCH, deceased, late a citizen of the United States, residing at Poughkeepsie, county of Dutchess, and State of New York, did in his lifetime invent certain new and useful Improvements in Milking-Machine-Operating Systems, of which the following is a full, clear, and exact description, reference being had to the accompanying drawings, which form a part of this specification.

This invention relates to improvements in means for producing pulsations in teat cups of milking machines, and it is particularly applicable to milking machines in which secondary pulsations are produced in the teat cups by a valve, adjacent to the cups, operated by master pulsations in a pipe line extending through the barn.

In a previous Patent No. 1,196,001 issued to this inventor August 29, 1916, is described a milking machine in which the master pulsations are caused by connecting the master pulsation pipe line alternately with a high vacuum tank and a low vacuum tank. At each connection with the low vacuum tank air is admitted to the pipe, and this air is subsequently removed at the next succeeding connection to the high vacuum tank. The removal of this air necessitated the use of a larger pump and more power. The object of this invention is to provide a master pulsating system operable through one pipe and requiring less pump capacity and power.

In the accompanying drawings, which illustrate embodiments in this invention:

Fig. 1 illustrates a system in which the pulsations occur simultaneously in all the teat cups, the secondary valve and appurtenant parts being shown in vertical section and the remainder of the system being shown in diagram.

Fig. 2 is a similar view of a system in which the pulsations in one pair of teat cups occur alternately with those in the other pair, substantially the same type of secondary pulsator being used as in Fig. 1.

Fig. 3 is a similar view of another system similar to that shown in Fig. 2, but in which another type of secondary pulsator is shown.

Referring first to Fig. 1: $a$ is a vacuum pump exhausting air from a tank $b$ which is intermittently connected by a valve $c$ with a pipe line $d$ having, adjacent to the stanchions, cocks and nipples $e$ adapted for connection by a flexible tube $f$ with a passage $g$ in the cover for the milk pail $h$. A vacuum relief valve $i$ admits air to the tank $b$ when the vacuum exceeds a predetermined value (usually about 18″ of mercury). Another similar valve $j$ admits air to the pipe $d$ when the vacuum there exceeds another predetermined value (usually about 15″ of mercury). Through the passage $k$ and check valve $l$ air is exhausted from the milk pail $h$.

Two ports $m$ and $n$ provide communication from the passage $g$ to points near the ends of a cylinder $o$, in which reciprocates a hollow piston and valve $p$ having a wide central annular groove $q$ and two narrower annular grooves $r$ and $s$, the two last named grooves communicating, by ports $t$ and $u$ respectively, with the interior of the piston. At the center of the piston is a plug having a restricted port $v$. The left end of the cylinder is in free communication with a small chamber $w$, the right end with a small chamber $x$, and the center with a port $y$ leading from the atmosphere. Between the center and the port $n$, a port $z$ leads to a chamber 11 having a volume about equal to the inflation spaces of a set of teat cups. Between the center and the port $m$, a port 12 leads through flexible tubes 13 to the inflation chambers of a set of teat cups 14, whose teat chambers are connected, by flexible tubes 15 and passages 16, with the interior of the milk pail $h$.

When in operation, the pump $a$ exhausts air from the tank $b$ and also, at each opening of the valve $c$, from the pipes $d$ and $f$, the passage $g$, the milk pail $h$ and the teat chambers of the cups 14. With the valve $p$ in the position shown, the sudden drop in pressure (that is, increase in degree of vacuum) caused by the opening of valve $c$ will be communicated to the left end of the piston, and expansion of the air in the chamber $x$ will drive the piston to the left. When the valve has made about two-thirds of its stroke, air from chamber 11 (which was previously connected with atmosphere) is admitted through port $z$, groove $s$, and port $u$ to the right hand end of the cylinder, raising the pressure (that is, reducing the degree of vacuum) at that end of the cylinder and causing the valve to complete its stroke. Before all this air can escape to the tank $b$, the valve $c$ closes, so that the resultant pressure in the pipes $d$ and $f$, passage $g$ and chambers $x$ and 11 will be considerably higher than that in the tank $b$. Displacement of air in the pail $h$ by incoming milk, inflow of air through the valve $j$ and unavoidable leakages will increase this rise of pressure. This higher pressure will be communicated slowly through the restricted port $v$ to the chamber $w$. At the same time, air at atmospheric pressure will pass through the port $y$, groove $q$, port 12 and tubes 13 to the inflation chambers of the teat cups.

When the valve $c$ is again opened, there is another sudden drop of pressure in the pipes $d$ and $f$ and passage $g$, which is immediately communicated to the right hand end of the piston $p$, and expansion of the air in chamber $w$ forces the piston to the right. When it has completed about two-thirds of its stroke, air from the inflation chambers of the teat cups, passing through pipes 13, port 12, groove $r$ and port $t$, reaches the left end of the piston, causes completion of the stroke and escapes through passage $g$. The piston and valve $p$ is now in the original position and the cycle is repeated.

The system and secondary pulsator shown in Fig. 2 are the same as those shown in Fig. 1, except that the port 12 communicates, through a tube 130, with one or more (preferably two) of the four teat cups, while the port $z$, instead of communicating with an air chamber 11, communicates, by a tube 110, with the remainder of the teat cups. For convenience, only two teat cups are shown. The operation is the same as described for Fig. 1.

The secondary pulsator shown in Fig. 3 is designed to accomplish the same purpose as that shown in Fig. 1, but to respond to a pulsation of a much smaller amplitude. $a$, $b$, $c$, $d$, $e$, $f$, $g$, $h$, $i$, $j$, $k$, $l$, 14, 15 and 16 correspond to, and perform the same functions as, similarly lettered parts in Figs. 1 and 2.

The passage $g$ communicates with a space 17 separated, by a diaphragm 18, from an air chamber 19. The space 17 communicates, by holes 20, with a passage 21 extending through a valve 22 attached to the diaphragm 18, and thence, by a restricted port 23, with the chamber 19. Around the valve 21 is an annular groove 24, which, when the valve is in the position shown, provides communication between air inlet ports 25 and two other ports 26 and 27.

At the top of the pulsator is a cylinder 28, in which a piston and valve 29 reciprocates. This piston has, through its center, a bore in which is a plug with a restricted passage 30 and, around its outside, two broad annular grooves 31 and 32, and two narrower annular grooves 33 and 34. These latter communicate, through ports 35 and 36, with the interior of the piston. Through the cylinder wall are two air inlet ports 37 and 38, two pulsation ports 39 and 40 (which are connected by flexible tubes 41 and 42 with the inflation chambers of teat cups 14) one vacuum port 43, and two other ports, 44 and 45, having communication, through check valves 46 and 47, with ports 26 and 27.

When in operation the pump $a$ exhausts air from the tank $b$. At each opening of valve $c$ there is a sudden exhaust of air from pipes $d$ and $f$, passage $g$, pail $h$ and the teat chambers of cups 14. Because of the check valve $l$, the vacuum is nearly uniform in the pail and teat cups. Air is also exhausted suddenly from the chamber 17 and expansion of the air in chamber 19 forces the diaphragm 18 and the valve 22 upward to the position shown in the drawing. The area of the diaphragm is so great that a small change of pressure will operate it.

When the piston 29 is in the position shown, the right hand end is in free communication, through the interior of the piston, port 36, groove 34, port 43, passage 21, and holes 20, with the chamber 17 and the vacuum pipe. When the diaphragm 18 and valve 22 rise to the position shown, air, at atmospheric pressure, is admitted, through ports 25, groove 24, port 26, valve 46, port 44, groove 33 and port 35 to the interior of the piston 29 and to its left hand end, forcing it quickly toward the right hand of the cylinder 28. As soon as the piston 29 moves to the right, air from the inflation chamber of one of the teat cups 14 shown passes, through tube 41, port 39, the interior of the piston 29, port 35, groove 33, port 43, passage 21 in the valve 22, and holes 20, into the chamber 17, helping to cause a quick rise of pressure to force the diaphragm 18 down.

While the diaphragm is in its upper position, air is exhausted through the port 23 from the chamber 19, so that the pressures in chambers 17 and 19 approach equality at the low pressure existing in the pipe line. When the diaphragm is in its lower position, air passes from the chamber 17 through the port 23 into the chamber 19, causing the pressures in the two chambers to again approach equality.

While the piston 29 is at the right hand end of the cylinder 28, air is exhausted as above described from the left end. When the valve $c$ again opens, it produces another sudden decrease of pressure in the pipes and the chamber 17, causing the diaphragm 18 and valve 22 to again rise. Air is now admitted, through port 25, groove 24, port 27, check valve 47, port 45, groove 34 and port 36, to the interior and right hand end of the piston 29, forcing it to the left. Air now comes from the inflation chambers of the other teat cup 14 through the tube 42, port 40, interior of the piston 29, port 36, groove 34, port 43, passage 21 and holes 20, to the chamber 17, helping to cause another rise in pressure to force the diaphragm 18 down.

When the piston 29 is at the left end of its cylinder, air is admitted, through port 37, groove 31, port 39, and tube 41, to the inflation chambers of one of the teat cups 14. When the piston is at the right hand, air is admitted through port 38, groove 32, port 40, and tube 42 to the inflation chambers of the other of the teat cups 14.

Of the four teat cups used, only two are shown. Preferably they will be operated in pairs.

The restricted port 30 acts in the manner described in Patent No. 1,321,372, issued November 11, 1919, to John L. Hulbert, to prevent premature movement of the piston 29 by gradual changes of pressure due to leakage, but it is too small to interfere with movements due to sudden changes in pressure.

Having now fully described this invention, what is claimed and described to protect by Letters Patent is:

1. In a milking machine operating system, in combination, an air suction apparatus, a single pipe line connected therewith, means to intermittently open communication between the pipe line and the suction apparatus to cause momentary reductions of pressure in the pipe line and alternately therewith to block the pipe line against flow of air therethrough, a teat cup, a pulsator, a pneumatic connection between the teat cup and the pulsator, and means to pneumatically connect the pulsator with the pipe line, the pulsator being adapted, responsive to successive reductions of pressure, to be shifted in opposite directions to cause pneumatic pulsations in the teat cup.

2. In a milking machine, in combination, an air suction apparatus, a pipe line, means to close communication between the pipe line and the suction apparatus and alternately therewith to open said connection to cause momentary reductions of pressure in the pipe line, a set of teat cups, a pulsator cylinder, a piston therein, and means responsive to said reductions of pressure to cause the piston to move to one end of its cylinder at one reduction and to the other end at the next succeeding similar reduction, the piston and cylinder being provided with ports and passages adapted to connect the teat cups alternately with atmosphere and with the pipe line.

3. In a milking machine operating system, in combination, an air suction apparatus, a single pipe line connected therewith, means to close communication between the pipe line and the suction apparatus and alternately therewith to open said communication to cause momentary reductions of pressure in the pipe line, a cylinder, means adapted to connect opposite ends of the cylinder with the pipe line, a piston valve in the cylinder adapted, in one position, to close the connections between one end of the cylinder and the pipe line and in the opposite position to close connection between the other end of the cylinder and the pipe line, whereby each pressure reduction tends to draw the piston from one position to the other, a teat cup, and a pneumatic connection between the teat cup and the cylinder, there being ports and passages adapted, in the operation of the piston, to connect the teat cup alternately with the pipe line and with atmosphere.

4. In a milking machine operating system, in combination, an air suction apparatus, a single pipe line connected therewith, means to close communication between the pipe line and the suction apparatus and alternately therewith to open said communication to cause momentary reductions of pressure in the pipe line, a pulsator comprising a cylinder and a piston therein, means causing successive pressure reductions to operate suctionally upon the respective ends of the piston, and means operating to produce an expansion of air upon one end of the piston while its other end is subjected to the suction specified, a teat cup, and a pneumatic connection between the teat cup and the pulsator.

5. In a milking machine operating system, in combination, an air suction apparatus, a single pipe line connected therewith, means to close communication between the pipe line and the suction apparatus and alternately therewith to open said communication to cause momentary reductions of pressure in the pipe line, a cylinder, means adapted to connect opposite ends of the cylinder with the pipe line, a piston valve in the cylinder adapted, in one position, to close the connections between one end of the cylinder and the pipe line and in the opposite position to close connection between the other end of the cylinder and the pipe line, whereby each pressure reduction tends to draw the piston from one position to the other, a teat cup, and a pneumatic connection between the teat cup and the cylinder, there being ports and passages adapted, in the operation of the piston, to connect the teat cup alternately with the pipe line and with atmosphere, the arrangement of the ports and passages being such that the air when exhausted from the teat cup acts upon the end of the piston that at the time is receding.

6. In a milking machine operating system, in combination, an air suction apparatus, a single pipe line connected therewith, means to intermittently open communication between the pipe line and the suction apparatus to cause momentary reductions of pressure in the pipe line and alternately therewith to block the pipe line against flow of air therethrough, two teat cups, a pulsator, pneumatic connections from the respective teat cups to the pulsator, and means to pneumatically connect the pulsator with the pipe line, the pulsator being adapted, responsive to successive reductions of pressure, to be shifted in opposite directions to first connect one teat cup with the atmosphere and the other with the pipe line and then reverse said connections.

7. In a milking machine operating system, in combination, an air suction apparatus, a single pipe line connected therewith, means to close communication between the pipe line and the suction apparatus and alternately therewith to open said communication to cause momentary reductions of pressure in the pipe line, a cylinder, means adapted to connect opposite ends of the cylinder with the pipe line, a piston valve in the cylinder adapted, in one position, to close the connections between one end of the cylinder and the pipe line and in the opposite position to close connection between the other end of the cylinder and the pipe line, whereby each pressure reduction tends to draw the piston from one position to the other, two teat cups, separate pneumatic connections from the teat cups to the cylinder, there being ports and passages adapted, in the operation of the piston, to admit air through one of said pneumatic connections to one teat cup and exhaust air through the other of said pneumatic connections from the other teat cup, and vice versa.

8. In a milking machine operating system, in combination, an air suction apparatus, a single pipe line connected therewith, means to close communication between the pipe line and the suction apparatus and alternately therewith to open said communication to cause momentray reductions of pressure in the pipe line, a pulsator comprising a cylinder and a piston therein, means causing successive pressure reductions to operate suctionally upon the respective ends of the piston, two teat cups, separate pneumatic connections therefrom to the pulsator, there being ports and passages cooperating with said connections to cause the air exhausted from the one teat cup to assist in moving the piston in one direction and the air exhausted from the other teat cup to assist in moving the piston in the other direction.

9. In a milking machine operating system, in combination, an air suction apparatus, a single pipe line connected therewith, means to close communication between the pipe line and the suction apparatus and alternately therewith to open said communication to cause momentary reductions of pressure in the pipe line, a cylinder, means adapted to connect opposite ends of the cylinder with the pipe line, a piston valve in the cylinder adapted, in one position, to close the connections between one end of the cylinder and the pipe line and in the opposite position to close connection between the other end of the cylinder and the pipe line, whereby each pressure reduction tends to draw the piston from one position to the other, two teat cups, separate pneumatic connections from the teat cups to the cylinder, there being ports and passages adapted, in the operation of the piston, to admit air through one of said pneumatic connections to one teat cup and exhaust air through the other of said pneumatic connections from the other teat cup, and vice versa, the arrangement of the ports and passages being such that the air, when exhausted from either teat cup, acts upon the end of the piston that at the time is receding.

10. In a milking machine, in combination, an air suction apparatus, means to exhaust air therefrom, a pipe line, means to close communication between the pipe line and the suction apparatus and alternately therewith to open said connection to cause momentary reductions of pressure in the pipe, teat cups, a pulsator, pneumatic connections between the pulsator and the teat cups, the pulsator being operable responsive to said reductions of pressure to connect the teat cups alternately with atmosphere and the pipe line; said pulsator comprising a casing and a diaphragm dividing the same into two chambers, means providing free communication from one chamber to said pipe line and restricted communication from the other chamber to said pipe line, a valve movable by the diaphragm, a cylinder, a piston therein, there being ports and passages in the valve adapted to cause movement of the piston and ports and passages in the piston and cylinder adapted to connect the teat cups, through said penumatic connections, alternately with atmosphere and the pipe line.

In testimony of which invention, I have hereunto set my hand, at Montgomery on this 27 day of November, 1920.

LUCY BURRUSS LEITCH,
*Administratrix of the estate of Meredith Leitch, deceased.*